United States Patent [19]
Nanataki et al.

[11] Patent Number: 5,908,682
[45] Date of Patent: Jun. 1, 1999

[54] CERAMIC MEMBER HAVING FINE THROUGHHOLES

[75] Inventors: Tsutomu Nanataki, Toyoake; Shigeki Nakao, Nagoya, both of Japan

[73] Assignee: NGK Insulators, Ltd.

[21] Appl. No.: 08/960,088

[22] Filed: Oct. 24, 1997

Related U.S. Application Data

[62] Division of application No. 08/649,191, May 17, 1996, abandoned.

[30] Foreign Application Priority Data

May 26, 1995 [JP] Japan .................................. 7-128133

[51] Int. Cl.$^6$ ............................. B32B 3/24; B41J 2/135
[52] U.S. Cl. ......................... 428/138; 428/137; 428/215; 428/688; 347/55; 347/76; 347/141
[58] Field of Search .................................. 428/137, 138, 428/215, 688; 347/55, 76, 141

[56] References Cited

U.S. PATENT DOCUMENTS

| | | | |
|---|---|---|---|
| 4,833,000 | 5/1989 | Trickett et al. | 428/137 |
| 5,204,696 | 4/1993 | Schmidlin et al. | 346/155 |
| 5,430,344 | 7/1995 | Takeuchi et al. | 310/330 |
| 5,475,279 | 12/1995 | Takeuchi et al. | 310/331 |
| 5,512,793 | 4/1996 | Takeuchi et al. | 310/328 |
| 5,517,076 | 5/1996 | Takeuchi et al. | 310/358 |
| 5,545,461 | 8/1996 | Takeuchi et al. | 428/138 |
| 5,600,197 | 2/1997 | Takeuchi et al. | 310/328 |
| 5,728,244 | 3/1998 | Nanataki et al. | 156/89 |

FOREIGN PATENT DOCUMENTS

| | | |
|---|---|---|
| 0526048 | 2/1993 | European Pat. Off. . |
| 0636593 | 2/1995 | European Pat. Off. . |
| 0649008 | 4/1995 | European Pat. Off. . |

OTHER PUBLICATIONS

National Technical Report vol. 35 No. 4 dated Aug. 1989, pp. 32–39 (Yoshimasa Itoh et al.) "Beam Jet Print Head" (with partial translation).

"Ink Jet Printer" publication dated Jul. 20, 1988, pp. 139–140 and p. 238.

Primary Examiner—William P. Watkins, III
Attorney, Agent, or Firm—Wall Marjama Bilinski & Burr

[57] ABSTRACT

Unitarily sintered ceramic member having fine throughholes. unitarily sintered material. The ceramic member has a ceramic substrate having at least one window and a thin ceramic plate laminated onto the substrate so as to cover the window, wherein the thin ceramic plate has a plurality of fine throughholes at the portion(s) corresponding to the at least one window and each hole-to-hole distance is 70 $\mu$m or less. This ceramic member having fine throughholes is made of a material of heat resistance, abrasion resistance and low thermal expansion and satisfies the requirements of high density, high precision and increased reliability to be possessed by such apparatuses as encoders, high-precision fine electric field shutters, ion current-controlling heads, scales and the like.

22 Claims, 6 Drawing Sheets

CERAMIC MEMBER HAVING FINE THROUGHHOLES

This is a Rule 62 Divisional of application Ser. No. 08/649,191, filed May 17, 1996, now abandoned.

BACKGROUND OF THE INVENTION (1) Field of the Invention

The present invention relates to a ceramic member having a plurality of fine throughholes.

(2) Description of the Related Art

Members having fine throughholes, used in products such as encoders, high-precision fine electric field shutters, ion current-controlling heads, scales and the like have heretofore been made of metals, synthetic resins, etc. for their excellent processability.

In the above products, members having fine throughholes are used to detect the position of the object to be treated or to record by or without passing, through the fine throughholes, a gas, a liquid, fine particles, a light or the like.

In recent years, higher density, higher precision and higher reliability have come to be required for these members having throughholes.

The above requirements, however, are not satisfied with the conventional materials, i.e. metals, synthetic resins, etc. Therefore, development of a member made of a new material has been expected.

OBJECT AND SUMMARY OF THE INVENTION

In view of the above situation, an object of the present invention is to provide a member having fine throughholes, which is made of a material of heat resistance, abrasion resistance and low thermal expansion, and which satisfies the requirements of high density, high precision and increased reliability to be possessed by such apparatuses as encoders, high-precision fine electric field shutters, ion current-controlling heads, scales and the like.

According to the present invention, there is provided a ceramic member of an unitarily sintered material having fine throughholes comprising: a ceramic substrate having at least one window and a thin ceramic plate laminated onto the substrate so as to cover the window, wherein the thin ceramic plate has a plurality of fine throughholes at the portion(s) corresponding to the at least one window and each hole-to-hole distance is 70 $\mu$m or less.

BRIEF DESCRIPTION OF THE DRAWINGS

FIG. 1A is a plan view; FIG. 1B is a sectional view taken at the I—I line of FIG. 1A; and FIG. 1C is a sectional view taken at the II—II line of FIG. 1A.

FIG. 2A is a plan view; FIG. 2B is a sectional view taken at the I—I line of FIG. 2A; and FIG. 2C is a sectional view taken at the II—II line of FIG. 2A.

FIG. 3A is a plan view; FIG. 3B is a sectional view taken at the I—I line of FIG. 3A; and FIG. 3C is a sectional view taken at the II—II line of FIG. 3A.

FIG. 5A is a plan view; FIG. 5B is a sectional view taken at the I—I line of FIG. 5A; and FIG. 5C is a sectional view taken at the II—II line of FIG. 5A.

DETAILED DESCRIPTION OF THE INVENTION

The preferred embodiments of the present invention include those ceramic members having fine throughholes wherein the thin ceramic plate is composed mainly of partially stabilized zirconia, or the thin ceramic plate is composed mainly of partially stabilized zirconia that comprises crystal grains having diameters of 2 $\mu$m or less, or the partially stabilized zirconia in the thin ceramic plate is zirconia stabilized partially with 2–6 mole % of yttrium oxide, or the fine throughholes of the thin ceramic plate have diameters of 70 $\mu$m or less, or the thin ceramic plate has a thickness of 50 $\mu$m or less, or the ceramic substrate has a thickness of 80 $\mu$m or more.

Herein, the diameter of each fine throughhole refers to a diameter when the throughhole has a circular shape; a long side when the throughhole has a rectangular shape; a major axis when the throughhole has an elliptic shape; and the longest diagonal when the throughhole has a polygonal shape. The shape of each fine throughhole may be one of the above-mentioned shapes or a combination thereof. Incidentally, the diameter of each fine throughhole is taken as the average of the diameters of each fine throughhole at the both sides of thin ceramic plate.

Figure 6:
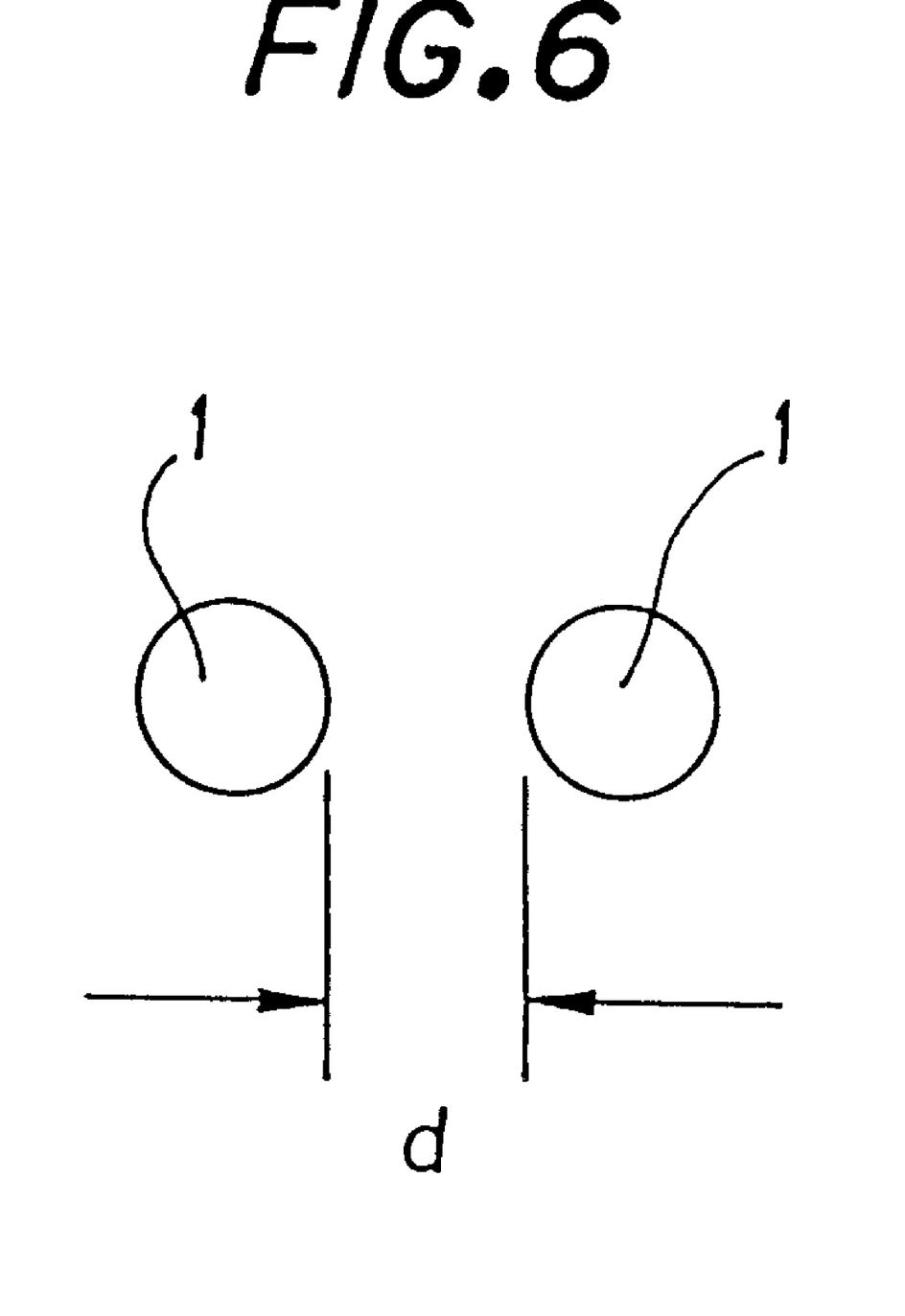
FIG. 6 is a explanatory drawing showing the distance "d" between two adjacent fine throughholes.

The distance "d" between two adjacent fine throughholes refers to the smallest wall thickness between two adjacent fine throughholes, as shown in FIG. 6.

The ceramic member having fine throughholes, according to the present invention can respond to a high-density requirement because, in the member, the hole-to-hole distance "d" is 70 $\mu$m or less. The ceramic member further has high reliability because it is made of a ceramic.

The thin ceramic plate is preferably made of partially stabilized zirconia. Partially stabilized zirconia has a small thermal expansion coefficient as compared with metals, and can endow throughholes with high position precision even at high temperatures. Further, partially stabilized zirconia has a large strength among various ceramic materials and accordingly has good handleability, durability and reliability; moreover, it has excellent corrosion resistance, abrasion resistance and heat resistance and accordingly can be applied to various media over a wide temperature range.

The thin ceramic plate composed mainly of partially stabilized zirconia comprises crystal grains having diameters of 2 $\mu$m or less, preferably 1 $\mu$m or less. This diameter range is necessary so that the thin ceramic plate composed mainly of partially stabilized zirconia can have sufficient levels of strength, abrasion resistance and corrosion resistance.

Yttrium oxide is used in an amount of 2–6 mole %, preferably 2.5–4.0 mole % as an agent for partial stabilization of zirconia. This amount of yttrium oxide is necessary in order for the thin ceramic plate to have sufficient levels of strength and abrasion resistance.

The fine throughholes of the thin ceramic plate have diameters of 70 $\mu$m or less. Such diameters are necessary so that the ceramic member of the present invention can respond to requirements of high density and high precision. In order to form fine throughholes having diameters of 70 μm or less, it is preferable that the thin ceramic plate is made of partially stabilized zirconia. Each of the fine throughholes may have a different size from those of the other fine throughholes. When fine throughholes all having the same size are formed, variance of sizes of the fine throughholes after being fired is desirably ±5 μm or less, more desirably ±3 μm or less, so as to avoid having variance in properties.

The thin ceramic plate has a thickness of 50 μm or less, preferably 40 μm or less, more preferably 30 μm or less. This small thickness makes formation of fine throughholes easy. That is, in punching by the use of a die or an NC punching machine, broken pin defects, variation in hole diameter at the top side and bottom side of the plate, and formation of fins on the plate surface or on the inner surface of fine throughholes can all be avoided or reduced. And, in laser processing, such variations in hole diameter, formation of fins, and processing time can all be reduced. Moreover, the above small thickness can reduce the resistance which a medium such as powder, liquid or the like undergoes when passing through the fine throughholes of the plate.

In order for the thin ceramic plate to have a thickness of 50 μm or less, the plate is preferably made mainly of partially stabilized zirconia, in view of the strength, toughness and abrasion resistance required for the plate.

The ceramic substrate is used in order to allow the ceramic member of the present invention to have a stiffness as a whole. The ceramic substrate has a (total) thickness of 80 μm or more, preferably 100 μm or more.

The ceramic substrate may have other function(s). The ceramic substrate may consist of a single layer or a plurality of layers. In the latter case, all the layers need not have the same shape and each layer may have a different function. Incidentally, the ceramic substrate 10 shown in FIGS. 2B and 2C has no window.

In sintering a laminate of a green sheet for the ceramic substrate and a thin green sheet having fine throughholes formed therein, stress is generated between the materials constituting the two green sheets. In order to relax this stress, it is preferable that the short side length (width) "w" of transverse direction (short side) of the window of the ceramic substrate in the layer adjoining the thin ceramic plate and the shortest distance "d" between two adjacent fine throughholes of the thin ceramic plate have the following relation:

$$w(mm) \geq 10/d(\mu m)$$

preferably $$w(mm) \geq 25/d(\mu m)$$

more preferably $$w(mm) \geq 50/d(\mu m)$$

When w (the short side length of window) is smaller than 10/d, cracks tend to appear between fine throughholes owing to the stress generated during sintering of the above-mentioned laminate.

When w (the short side length of window) is too large, there arise reductions in, for example, (1) handleability of the green laminate, (2) strength of the sintered laminate and (3) flatness of the thin ceramic plate. Therefore, w is desirably 10 mm or less.

FIGS. 1A, 1B, 1C, 2A, 2B, 2C, 3A, 3B, and 3C show examples of the ceramic member having fine throughholes, according to the present invention.

Figure 1A:
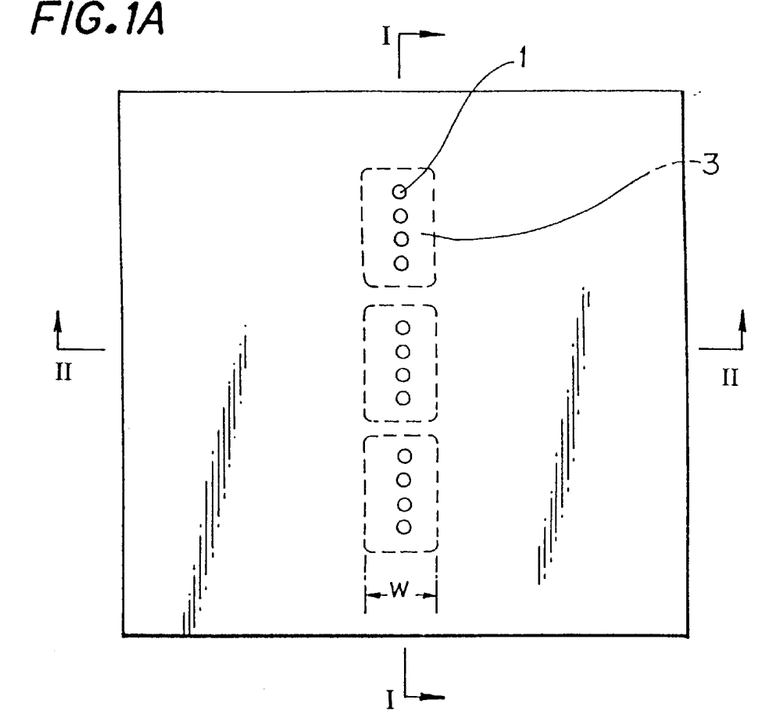
FIGS. 1A, 1B and 1C show an example of the ceramic member having fine throughholes, according to the present invention.
Figure 1B:
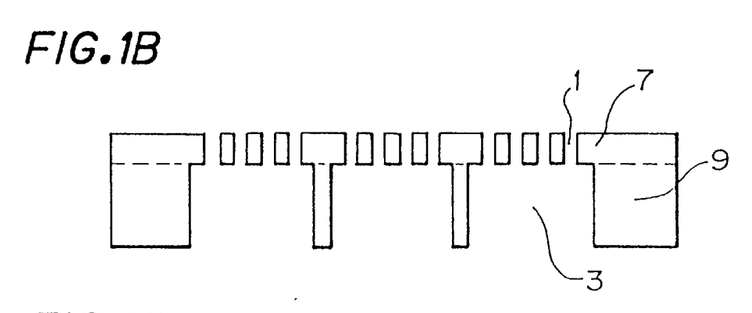
Figure 1C:
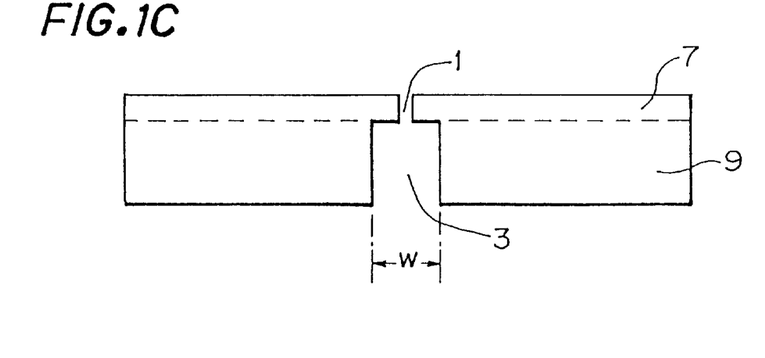
Figure 2A:
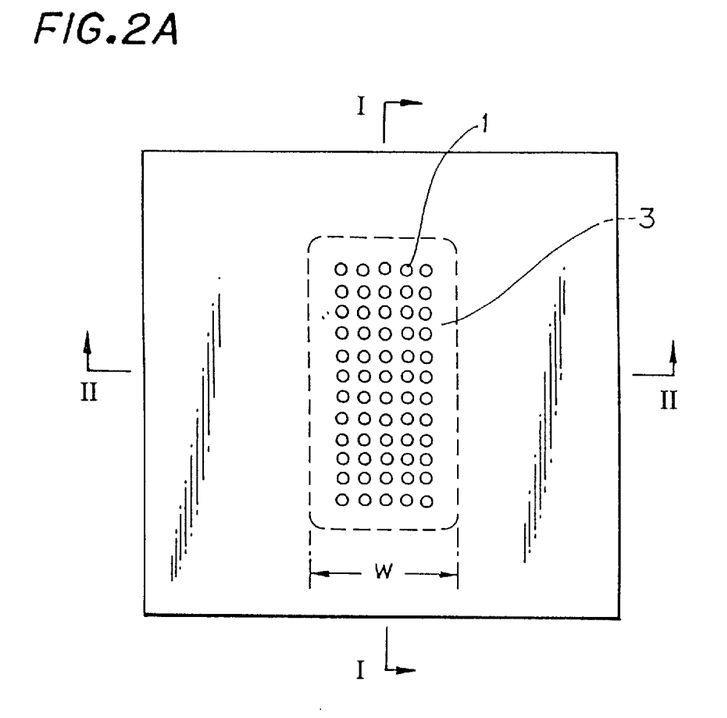
FIGS. 2A, 2B and 2C show another example of the ceramic member having fine throughholes, according to the present invention.
Figure 2B:
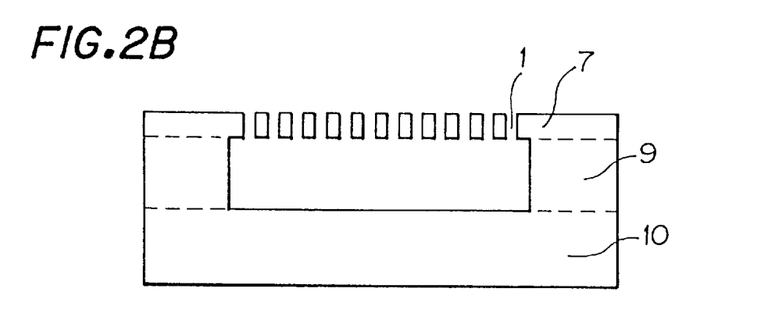
Figure 2C:
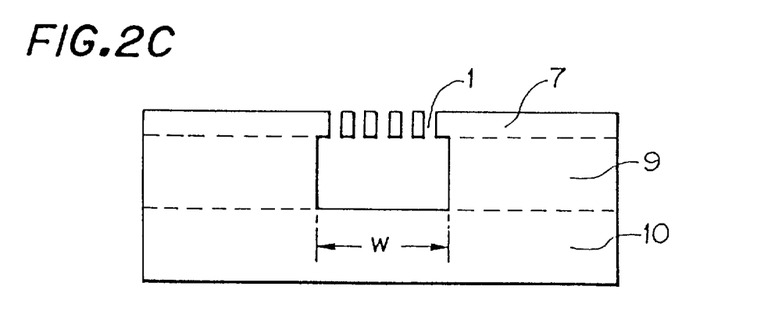
Figure 3A:
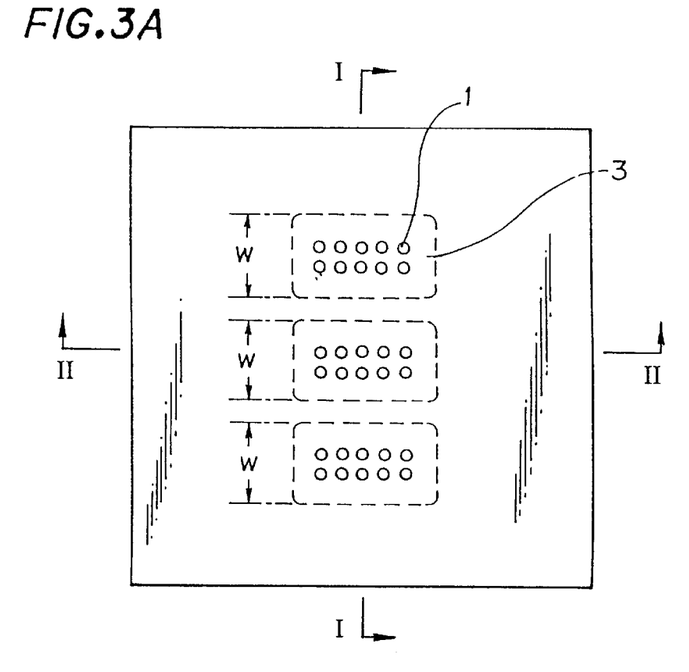
FIGS. 3A, 3B and 3C show still another example of the ceramic member having fine throughholes, according to the present invention.
Figure 3B:
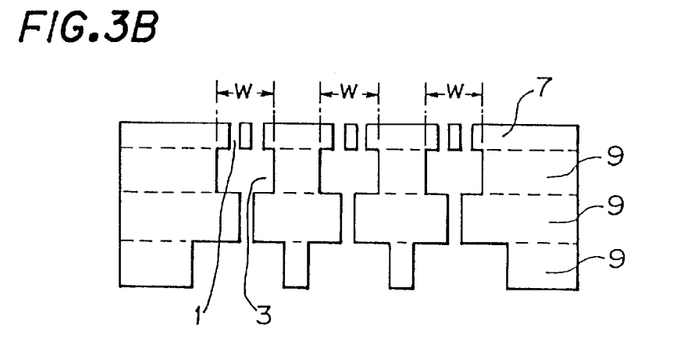
Figure 3C:
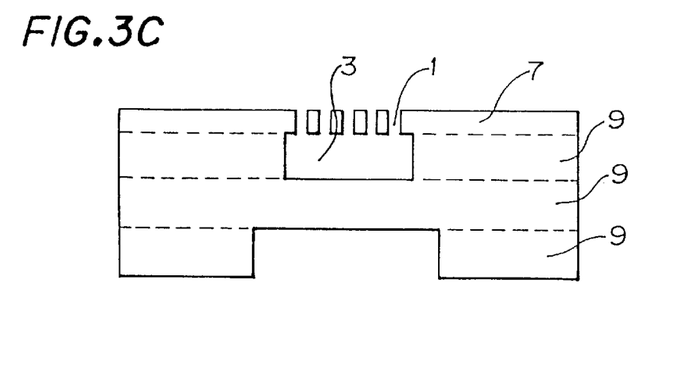

FIGS. 1A, 1B and 1C show a ceramic member wherein a thin ceramic plate 7 having fine throughholes 1 is laminated on a ceramic substrate 9 having windows 3 to form a unitarily sintered material. FIGS. 2A, 2B, and 2C show a ceramic member wherein a thin ceramic plate 7 having fine throughholes 1, a ceramic substrate 9 having a window 3 and a ceramic substrate 10 having no window are laminated in this order to form a unitarily sintered material. FIGS. 3A, 3B, and 3C show a ceramic member wherein a thin ceramic plate 7 having fine throughholes 1 is laminated on three layers of ceramic substrates 9 each having windows 3 (the window shapes of one substrate are different from those of other substrates), to form a unitarily sintered material.

In the present invention, the green sheet for the thin ceramic plate and the green sheet for the ceramic substrate are produced as follows. A slurry or paste for each green sheet is prepared in a conventional manner by mixing, into a ceramic powder, an appropriate binder, an appropriate plasticizer, an appropriate dispersing agent, an appropriate sintering aid, an appropriate organic solvent, etc. From the slurry or paste is formed a ceramic green sheet of desired thickness by a known method such as doctor blade, calendering, printing process, reverse roll coater or the like. Then, cutting, punching, formation of fine throughholes, etc. are conducted as necessary; a plurality of green sheets are laminated by thermal pressing or the like; thereby, a unitary laminate having a desired shape and a desired thickness is formed. The formation of fine throughholes is conducted, for example, by the use of a die or an NC punching machine or by excimer laser processing. Incidentally, the formation may be conducted for a green sheet before lamination or for a laminate.

When there is used, as the thin ceramic plate, one composed mainly of partially stabilized zirconia, it is possible to add, to a partially stabilized zirconia powder, 30% by weight or less of an auxiliary such as alumina, silica, transition metal oxide, clay, mullite, cordierite, spinel, titania or a mixture thereof.

The unitary laminate is then sintered and converted to a unitarily sintered material. The sintering temperature is generally about 1,200–1,700° C., preferably about 1,300–1,600° C.

Incidentally, when the unitarily sintered material has warpage, the warpage can be corrected by placing a flat ceramic-made weight or the like on the sintered material and subjecting them to resintering at a temperature close to the above-mentioned sintering temperature.

Desirably, the particle diameters of powder in a green sheet for the thin ceramic plate satisfy the following two conditions in order for the diameters of fine throughholes and the distance between two adjacent fine throughholes to fall in respective target levels. In formation of fine throughholes in green sheet by mechanical punching or by excimer laser processing, unlike in the case of processing of sintered substrate, particles per se cannot be cut. Therefore, when the particle diameters of powder are large, the "after processing" surface of green sheet and inner surfaces of the fine throughholes for thin ceramic plate is inferior in precision, flatness, and smoothness and has fins.

Also, small particle diameters of powder are effective for making small the elongation of the green sheet for the thin ceramic plate taking place during formation of fine throughholes.

Condition 1 for particle diameters of powder

A green sheet for the thin ceramic plate is heat-treated at 500° C. for 2 hours to remove the organic components contained therein, such as binder, plasticizer, dispersing agent and the like, whereby a test sample is prepared. This test sample is measured for specific surface area by BET. Using this specific surface area, a sphere-equivalent diameter $D_{BET}$ of powder particles in the green sheet is calculated. By allowing the $D_{BET}$ to be in the following range, the resulting green sheet can have improved processability and handleability in formation of fine throughholes:

$$0.02 \leq D_{BET} \leq 0.2 \ [\mu m]$$

wherein $$D_{BET} = 6/\rho S \ [\mu m]$$

ρ: theoretical density of powder [g/cm³]

S: specific surface area by BET, of powder [m²/g]

When $D_{BET}$ is smaller than 0.02, the particle diameters of powder are too small and it is difficult to produce a green sheet of uniform quality. Further, an adhesion among powders increases, thereby deteriorating the precision, flatness, and smoothness.

Condition 2 for particle diameters of powder

A slurry or paste for the green sheet for the thin ceramic plate is diluted with the same solvent as used in the slurry or paste and then measured for average particle diameter by the use of LA-700 (a laser diffraction type particle size tester manufactured by Horiba). This average particle diameter is required to be 0.8 μm or less, preferably 0.6 μm or less. The smaller the average particle diameter, the higher the flatness and smoothness of the surface or the inner surface of the fine throughholes of the green sheet after punching or laser excimer processing.

By allowing a volume percentage of ceramic powder and a volume percentage of organic components, both contained in the green sheet for the thin ceramic plate, to satisfy the following formulas, there can be expected an increase in precision of formed fine throughholes, an improvement in flatness and smoothness of the surface of processed green sheet or the inner surfaces of the fine throughholes formed therein, a reduction in generation of attachments in the green sheet, and reduction in elongation of the green sheet. Incidentally, the organic components refer to binder, plasticizer, dispersing agent, etc.

$$0.80 \leq A + B \leq 0.98$$

$$0.40 \leq A \leq 0.55$$

$$A = GD \times [a/(a+b)] \times 1/\rho_{ce}$$

$$B = GD \times \Sigma\{[b_i/(a+b)] \times 1/\rho_i\}$$

wherein

A: volume percentage of ceramic powder,

B: volume percentage of organic components, a: parts by weight of ceramic powder, b: parts by weight of organic components (b=Σb$_i$), b$_i$: parts by weight of single organic component, GD: density of "as molded" green sheet [g/cm³], $\rho_{ce}$: theoretical density of ceramic powder [g/cm³], $\rho_i$: theoretical density of single organic component [g/cm³].

The crystal phase of partially stabilized zirconia in the thin ceramic plate having fine throughholes is allowed to consist mainly of a tetragonal system or at least two systems selected from cubic system, tetragonal system and monoclinic system. The thin ceramic plate having fine throughholes is preferably composed mainly of partially stabilized zirconia having such a crystal phase, because such a composition can endow the thin ceramic plate with excellent strength and toughness.

It is advantageous to use an adhesive layer between the green sheet for the thin ceramic plate and the green sheet for the ceramic substrate. Use of this adhesive layer can reduce the pressure required for laminating the two green sheets. The lamination pressure is preferably 100 kg/cm² or less, more preferably 40 kg/cm² or less. Too large a lamination pressure tends to generate cracks between fine throughholes because the distance between fine throughholes is small.

The material for the adhesive layer may be the slurry, paste, binder, plasticizer, solvent or mixture thereof, all used in production of the green sheet.

The adhesive layer is formed by coating, printing, spraying or the like.

Preferably, the sintering shrinkage curve of the green sheet for thin ceramic plate and the sintering shrinkage curve of the green sheet for the ceramic substrate satisfy the following condition:

$$-50° C. \leq T \text{ (thin plate)} - T \text{ (substrate)} \leq +50° C.$$

more preferably $$-20° C. \leq T \text{ (thin plate)} - T \text{ (substrate)} \leq 20° C.$$

Desirably, the two curves are identical particularly at the initial period of sintering shrinkage. In the above formula, T (thin plate) refers to a temperature (°C.) at which the green sheet for the thin ceramic plate, when subjected per se to sintering under the same temperature conditions as applied for the laminate of the above two green sheets, shows 50% of the shrinkage S (thin plate) in the surface direction; and T (substrate) refers to a temperature (°C.) at which the green sheet for the ceramic substrate, when subjected per se to sintering under the same temperature conditions as applied for the laminate of the above two green sheets, shows 50% of the shrinkage S (substrate) in the surface direction.

When the above condition is not met, the thin ceramic plate, which has a small thickness, tends to form wrinkles and dents owing to the stress generating during sintering; further, the thin ceramic plate, in which the hole-to-hole distance is small, tends to generate cracks between the holes.

Next, the present invention is specifically described by way of Example.

First, a thin green sheet was prepared as follows.

In a ball mill were mixed, for 30 hours, 100 parts by weight of a partially stabilized zirconia powder containing 3 mole % of $Y_2O_3$ ($D_{BET}$ of powder=0.1 μm), 8 parts by weight of a polyvinyl butyral resin (binder), 3 parts by weight of DOP (plasticizer), 2 parts by weight of a sorbitan fatty acid ester type dispersing agent, 35 parts by weight of xylene (solvent) and 35 parts by weight of 1-butanol (solvent), whereby a slurry for green sheet formation having a viscosity of 2,000 cp was obtained. The slurry was subjected to defoaming under vacuum to adjust the viscosity to 4,000 cp. Using the resulting slurry, a thin green sheet was formed so as to have a thickness (after sintering) of 30 μm, by the use of a doctor blade apparatus.

The slurry after defoaming under vacuum was diluted with a xylene/1-butanol solvent (1:1 by weight ratio) and measured for average particle diameter. The average particle diameter was 0.58 μm. Incidentally, the tester used for the measurement was LA-700 (a laser diffraction type particle size tester manufactured by Horiba).

In the above-obtained thin green sheet, the volume percentage of ceramic powder was 49%, and the total of the volume percentage of organic components other than solvent and the volume percentage of ceramic powder was 88%.

Figure 5A:
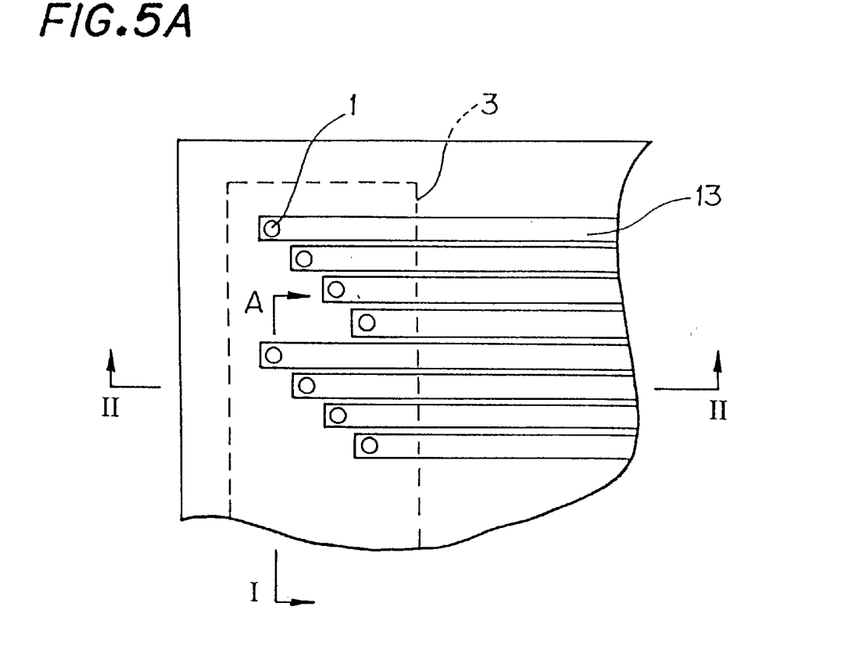
FIGS. 5A, 5B and 5C show an example of the constitution of an electrode for an electric field shutter.
Figure 5B:
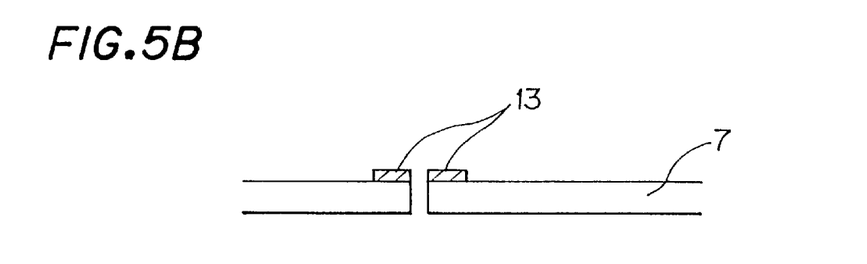
Figure 5C:
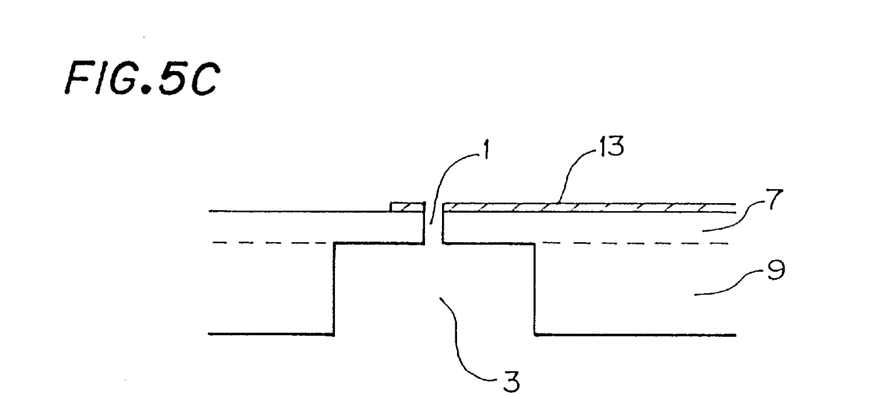

The thin green sheet was subjected to punching by an NC punching machine to form 2,832 fine throughholes 1 so as to have a hole diameter of 40 μm and a hole-to-hole distance of 36.7 μm after being fired in four rows each of 708 holes, as shown in FIGS. 5A, 5B, and 5C. Then, the sheet was fired, and subsequently cut so as to have an external form of 230 mm×20 mm.

Next, using the above-obtained slurry for green sheet formation, a green sheet for the ceramic substrate was prepared so as to have a thickness (after sintering) of 150 μm, by the use of a doctor blade apparatus.

On this green sheet for the ceramic substrate was formed an adhesive layer as follows. In a triroll mill were kneaded 100 parts by weight of a partially stabilized zirconia powder containing 3 mole % of $Y_2O_3$ ($D_{BET}$ of powder=0.1 μm), 13 parts by weight of a polyvinyl butyral resin (binder), 5 parts by weight of DOP (plasticizer) and 50 parts by weight of 2-ethylhexanol, whereby an adhesive paste having a viscosity of 20,000 cp was obtained. This paste was printed on the green sheet for ceramic substrate by the use of a screen printing machine to form an adhesive layer having a thickness (after drying) of 6 μm.

The green sheet having an adhesive layer thereon was subjected to cutting and punching to obtain a shape (window size: 201 mm×0.95 mm) as shown in FIGS. 5A, 5B, and 5C.

The thin green sheet and the green sheet having an adhesive layer thereon were laminated and thermal-pressed under the conditions of 30 kg/cm², 80° C. and 1 minute to produce a unitary laminate.

The unitary laminate was sintered at 1,500° C. for 3 hours. The resulting unitarily sintered material was sandwiched between flat porous aluminum plates of 2 mm in thickness and resintered at 1,500° C. for 5 hours to correct warpage. In the sintered material, the average grain diameter of ceramic grains in the thin ceramic portion was 0.7 μm.

Thus, there can be produced a ceramic member which is a unitarily sintered material comprising a thin ceramic plate 7 having fine throughholes 1 and a ceramic substrate 9 having a window 3. By forming gold electrodes 13 on this ceramic member, there can be obtained a field shutter as shown in FIGS. 5A, 5B, and 5C.

Figure 4:
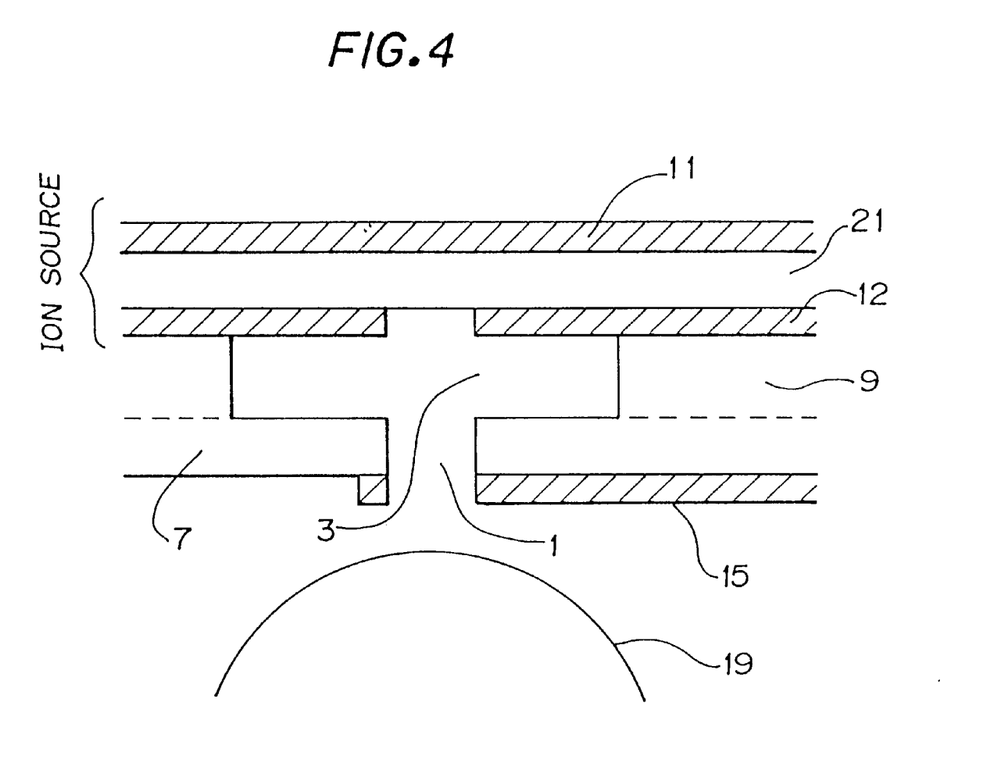
FIG. 4 shows an example of the constitution of an ion current-controlling head.

The above-produced ceramic member having fine throughholes can also be used as an ion current-controlling head, as shown in FIG. 4.

That is, by combining (1) the above-produced ceramic member having formed thereon electrodes 15 for electric field shutter (gold electrodes having a thickness of 0.3 μm), (2) an ion source comprising a thin dielectric plate 21 and a line electrode 11 and a finger electrode 12 provided on both sides of the plate, and (3) a dielectric drum 19, an ion current-controlling head as shown in FIG. 4 can be assembled.

The application of the present ceramic member is not restricted to the ion current-controlling head. The present ceramic member can be used also in other application requiring a member having fine throughholes in the thin plate portion.

As is clear from the above description, the present ceramic member having fine throughholes can be applied to various media over a wide temperature range and is superior in positional and dimensional precisions as well as in durability, since the thin ceramic plate portion is made of a ceramic material of heat resistance, abrasion resistance, corrosion resistance and low thermal expansion. Therefore, the present ceramic member is applicable to a wide range of apparatuses and is very useful.

What is claimed is:

1. An electric field shutter, comprising:
   a ceramic substrate having at least one window formed therethrough;
   a thin ceramic plate laminated on and integrally sintered to said ceramic substrate so as to cover said at least one window, said thin ceramic plate having a thickness not greater than 50 μm and a plurality of throughholes formed therethrough so as to expose said at least one window, said throughholes being spaced apart from each other a distance not greater than 70 μm; and
   an electrode formed proximate an opening of each of said throughholes.

2. The shutter of claim 1, wherein said thin ceramic plate has an inner surface exposed to said at least one window and an opposed outer surface, and said electrode is formed on said outer surface.

3. The shutter of claim 1, wherein said thin ceramic plate comprises partially stabilized zirconia.

4. The shutter of claim 3, wherein said thin ceramic plate comprises crystal grains having diameters not greater than 2 μm.

5. The shutter of claim 3, wherein the partially stabilized zirconia is zirconia stabilized partially with 2–6 mole % of yttrium oxide.

6. The shutter of claim 4, wherein the partially stabilized zirconia is zirconia stabilized partially with 2–6 mole % of yttrium oxide.

7. The shutter of claim 1, wherein said throughholes have diameters not greater than 70 μm.

8. The shutter of claim 3, wherein said throughholes have diameters not greater than 70 μm.

9. The shutter of claim 1, wherein said ceramic substrate has a thickness of at least 80 μm.

10. The shutter of claim 3, wherein said ceramic substrate has a thickness of at least 80 μm.

11. A ceramic member, comprising:
    a ceramic substrate having at least one window formed therethrough;
    a thin ceramic plate laminated on and integrally sintered to said ceramic substrate so as to cover said at least one window, said thin ceramic plate having a thickness not greater than 50 μm and a plurality of throughholes formed therethrough so as to expose said at least one window; and
    an electrode formed proximate an opening of each of said throughholes.

12. The ceramic member of claim 11, wherein said throughholes are spaced apart from each other a distance not greater than 70 μm.

13. The ceramic member of claim 11, wherein said thin ceramic plate has an inner surface exposed to said at least one window and an opposed outer surface, and said electrode is formed on said outer surface.

14. The ceramic member of claim 11, wherein said thin ceramic plate comprises partially stabilized zirconia.

15. The ceramic member of claim 14, wherein said thin ceramic plate comprises crystal grains having diameters not greater than 2 μm.

16. The ceramic member of claim 14, wherein the partially stabilized zirconia is zirconia stabilized partially with 2–6 mole % of yttrium oxide.

17. The ceramic member of claim 15, wherein the partially stabilized zirconia is zirconia stabilized partially with 2–6 mole % of yttrium oxide.

18. The ceramic member of claim 11, wherein said throughholes have diameters not greater than 70 μm.

19. The ceramic member of claim 14, wherein said throughholes have diameters not greater than 70 μm.

20. The ceramic member of claim 11, wherein said ceramic substrate has a thickness of at least 80 μm.

21. The ceramic member of claim 14, wherein said ceramic substrate has a thickness of at least 80 μm.

22. An electric field shutter for selectively imprinting matter on a medium, comprising:

- a ceramic substrate having at least one window formed therethrough;
- a thin ceramic plate laminated on and integrally sintered to said ceramic substrate so as to cover said at least one window, said thin ceramic plate having a thickness not greater than 50 μm and a plurality of throughholes formed therethrough so as to expose said at least one window, said throughholes being spaced apart from each other a distance not greater than 70 μm; and
- an electrode formed proximate an opening of each of said throughholes;
- wherein one of said ceramic substrate and said thin ceramic plate is in direct opposition to the medium to be imprinted, and matter is selectively ejected through each of said plurality of throughholes by selectively energizing each respective electrode.

* * * * *